United States Patent [19]

Spitz

[11] 4,220,174
[45] Sep. 2, 1980

[54] FLUID CONTROL VALVES

[76] Inventor: Russell W. Spitz, 6802 Tanglewood Rd., Boardman, Ohio 44512

[21] Appl. No.: 891,450

[22] Filed: Mar. 29, 1978

[51] Int. Cl.³ .............................................. F16K 11/07
[52] U.S. Cl. ............................... 137/271; 137/625.65; 137/625.68; 251/324; 251/325
[58] Field of Search ............. 137/271, 625.65, 625.68; 251/DIG. 1, 324, 325; 277/205

[56] References Cited

U.S. PATENT DOCUMENTS

| | | | |
|---|---|---|---|
| 583,822 | 6/1897 | Shem | 137/625.68 |
| 650,777 | 5/1900 | Bromley | 137/625.68 |
| 763,694 | 6/1904 | Robinson | 137/625.68 |
| 948,649 | 2/1910 | Koelkebeck | 137/625.68 |
| 2,645,450 | 7/1953 | Chessman | 137/625.68 |
| 2,940,465 | 6/1960 | Frantz | 251/325 X |
| 3,580,286 | 5/1971 | Bash | 137/625.68 |
| 3,635,249 | 1/1972 | Kirkman | 251/324 X |
| 3,960,166 | 6/1976 | Linser | 137/271 |
| 4,096,880 | 6/1978 | Lemmon et al. | 137/625.68 X |

FOREIGN PATENT DOCUMENTS 2412652  10/1974  Fed. Rep. of Germany ...... 137/625.68

Primary Examiner—Gerald A. Michalsky
Attorney, Agent, or Firm—Michael Williams

[57] ABSTRACT

A valve for controlling the flow of a liquid under pressure and capable of flowing a maximum amount of liquid and still be shifted by a commercially available, industry standardly-accepted solenoid. My improved valve utilizes only four dynamic seals between the valve plunger and the bore through which the plunger operates to minimize breakaway force required to move the plunger from one position to another. The valve incorporates novel plunger and separator constructions wherein valves of different operating capabilities may be formed from common parts and selectively interchangeable parts.

8 Claims, 10 Drawing Figures

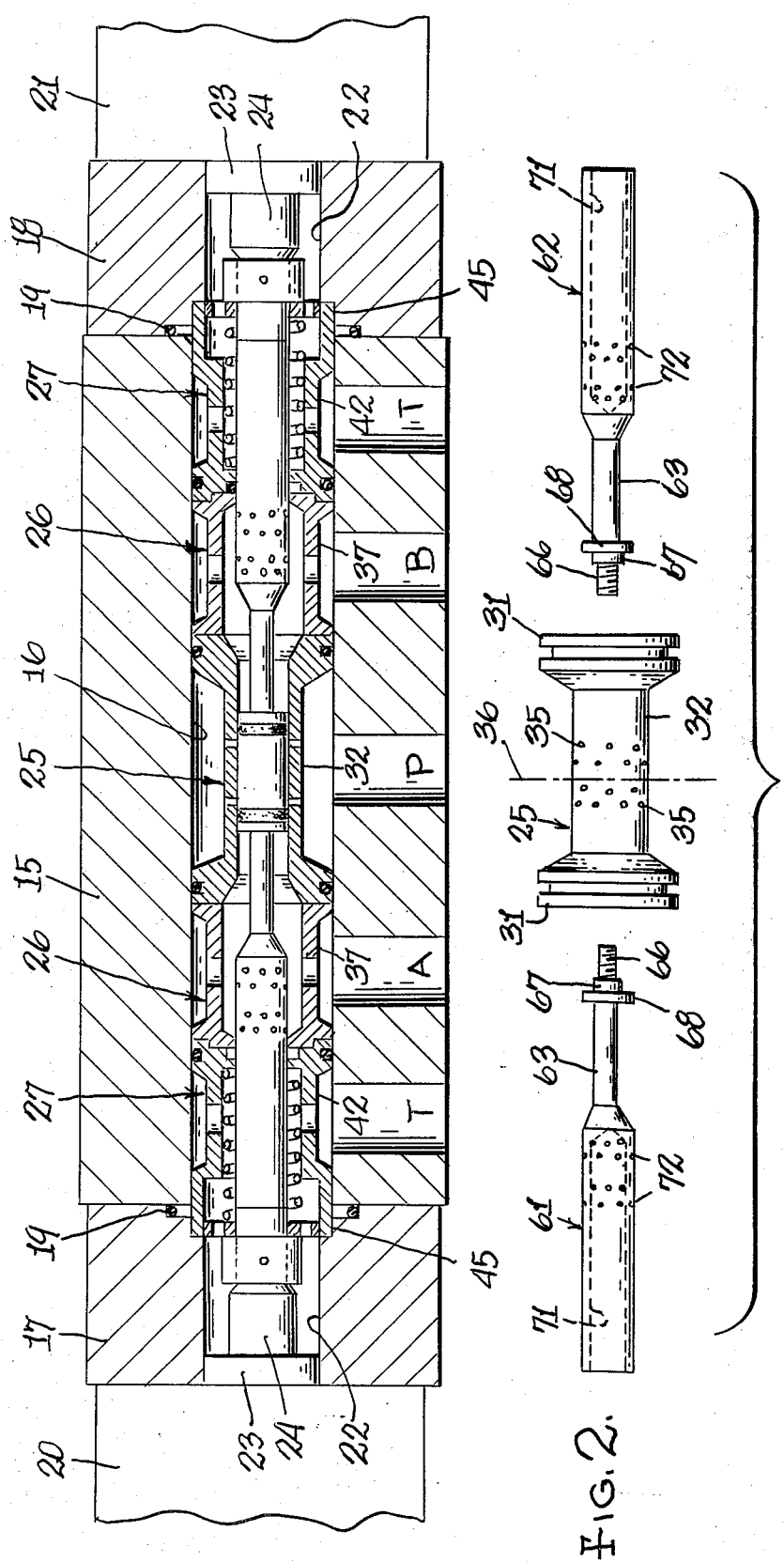

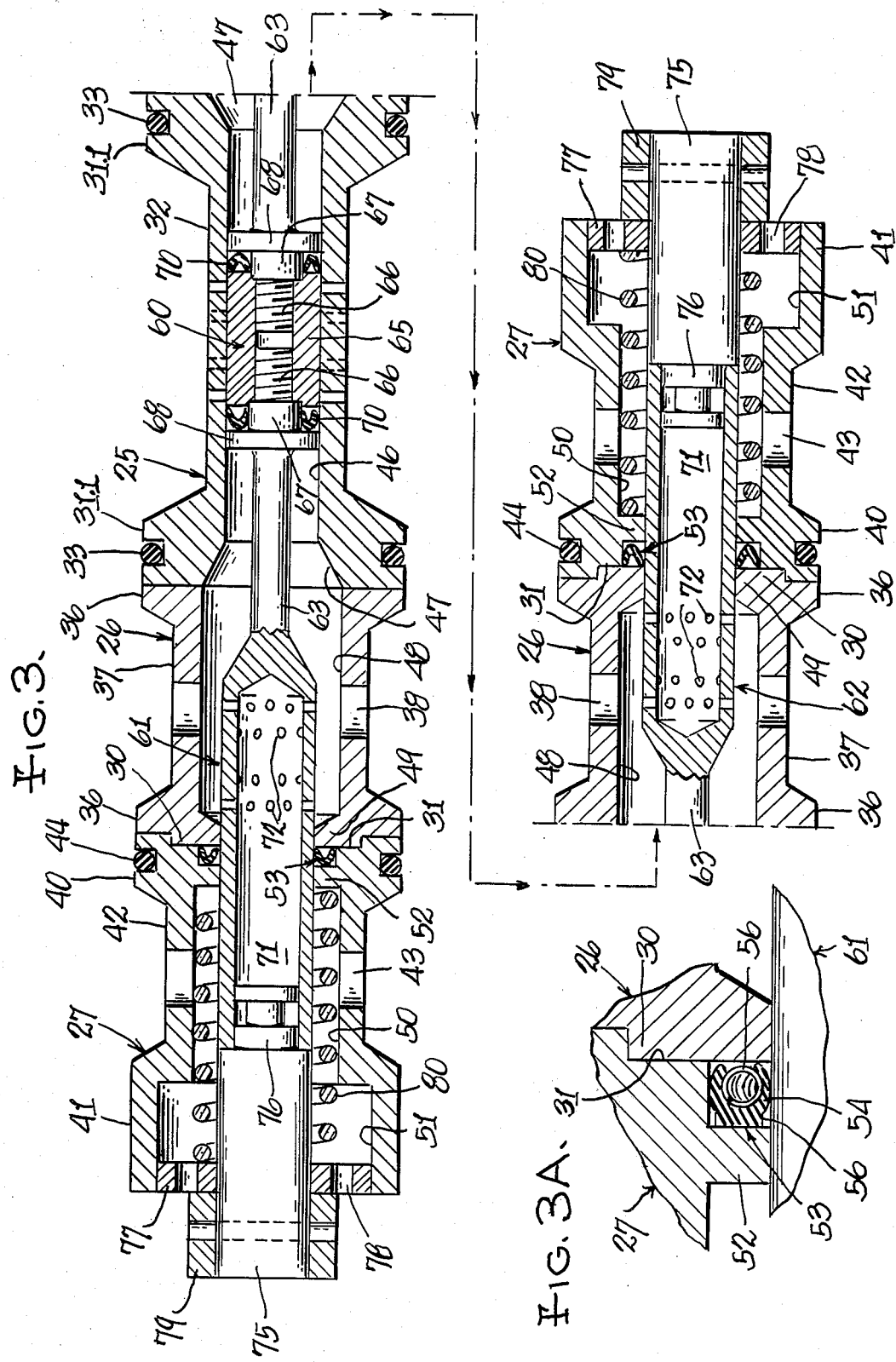

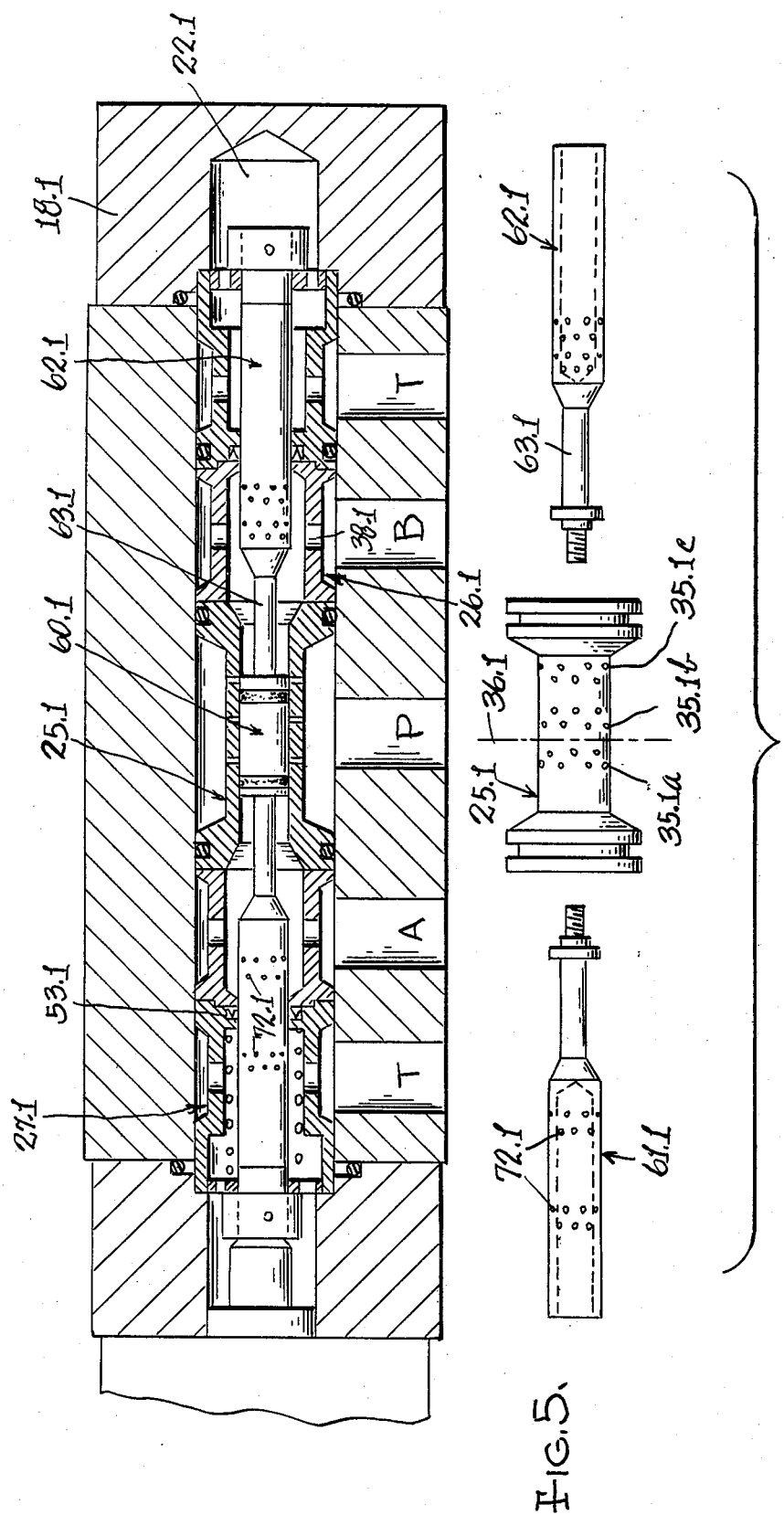

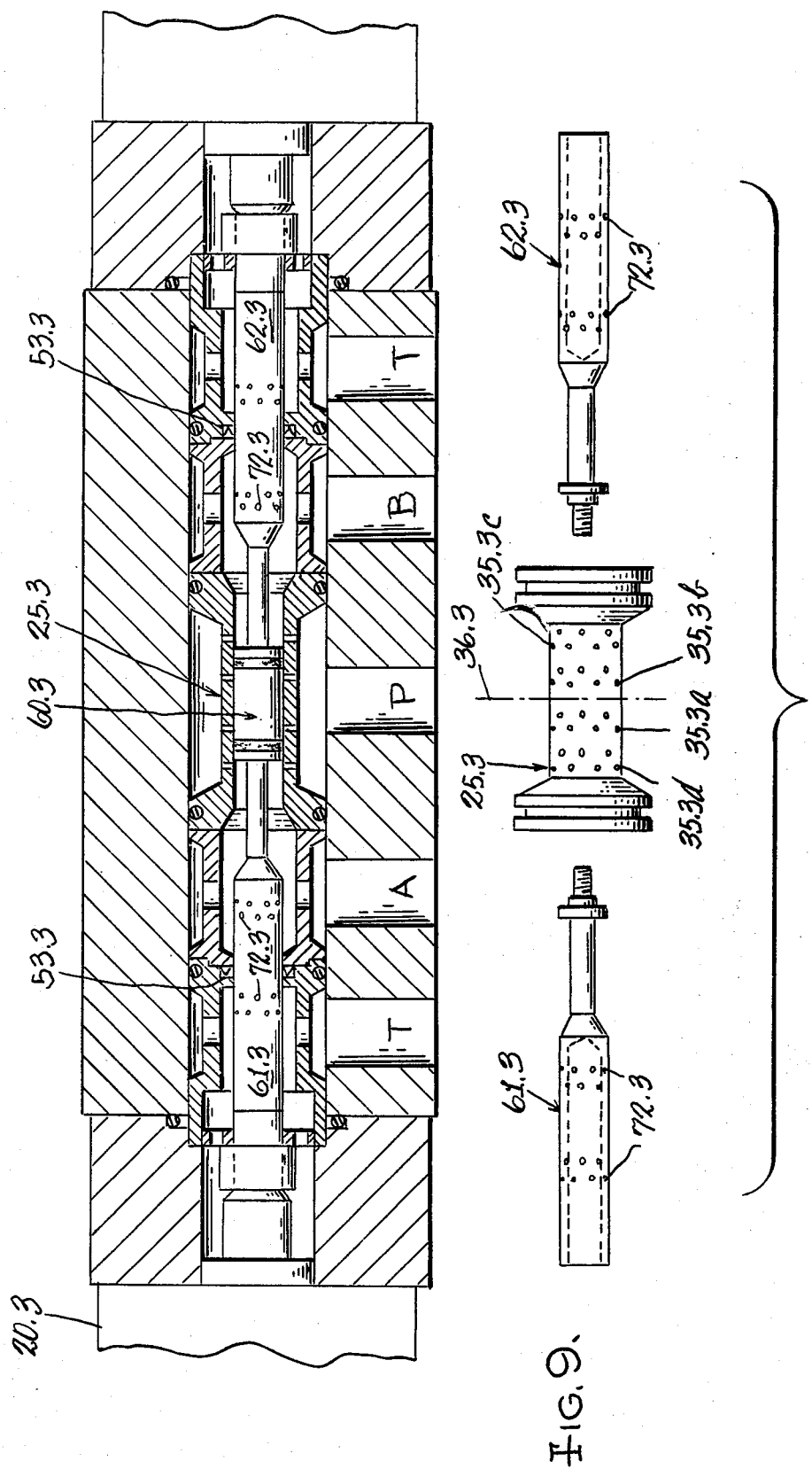

FLUID CONTROL VALVES

BACKGROUND AND SUMMARY

My valve is an improvement over the prior art in that it utilizes only four dynamic seals between the valve plunger and the bore through which it operates. The valve incorporates a center separator in communication with the pressure port of the valve body and a pair of separators on each longitudinal end of the center separator, the separators of each pair being in communication respectively, with a cylinder and tank port of the valve body.

The valve plunger is formed with a center section which operates through the bore of the center separator, and opposite end sections which operate through the bores of respective pairs of the end separators. The opposite end sections have reduced diameter portions which connect to the center section. Liquid from the pressure source flows over the reduced diameter portion to the respective cylinder ports so that flow of about 10 to 15 gallons per minute is made possible, as opposed to flow of about 5 gallons per minute in the prior art valves.

The center separator and the plunger end sections of my improved valve are interchangeable with like parts of the same physical dimension but with different porting arrangements so that various valving operations may be obtained.

DESCRIPTION OF THE DRAWINGS

In the drawings accompanying this description and forming a part of this application, there is shown, for purpose of illustration, an embodiment which my invention may assume, and in these drawings:

FIG. 1 is a longitudinal cross-sectional view through a valve of my invention,

FIG. 2 is a separated elevational view of certain parts used in the construction of FIG. 1 to make the valve a three-position valve with all ports blocked in center position, FIG. 3 is an enlarged sectional view of the separator and plunger assembly shown in FIG. 1, FIG. 3A is an enlarged fragmentary section of a dynamic seal construction, FIG. 4 is a view similar to FIG. 1, FIG. 5 is a separated elevational view of certain parts used in the construction of FIG. 4 to make the valve a single solenoid, spring return, two-position valve, FIG. 8 is a view similar to FIG. 1, and FIG. 9 is a separated elevational view of certain parts used in the construction shown in FIG. 8 to make the valve a springless two-position valve.

DESCRIPTION OF THE PREFERRED EMBODIMENT

Figure 6:
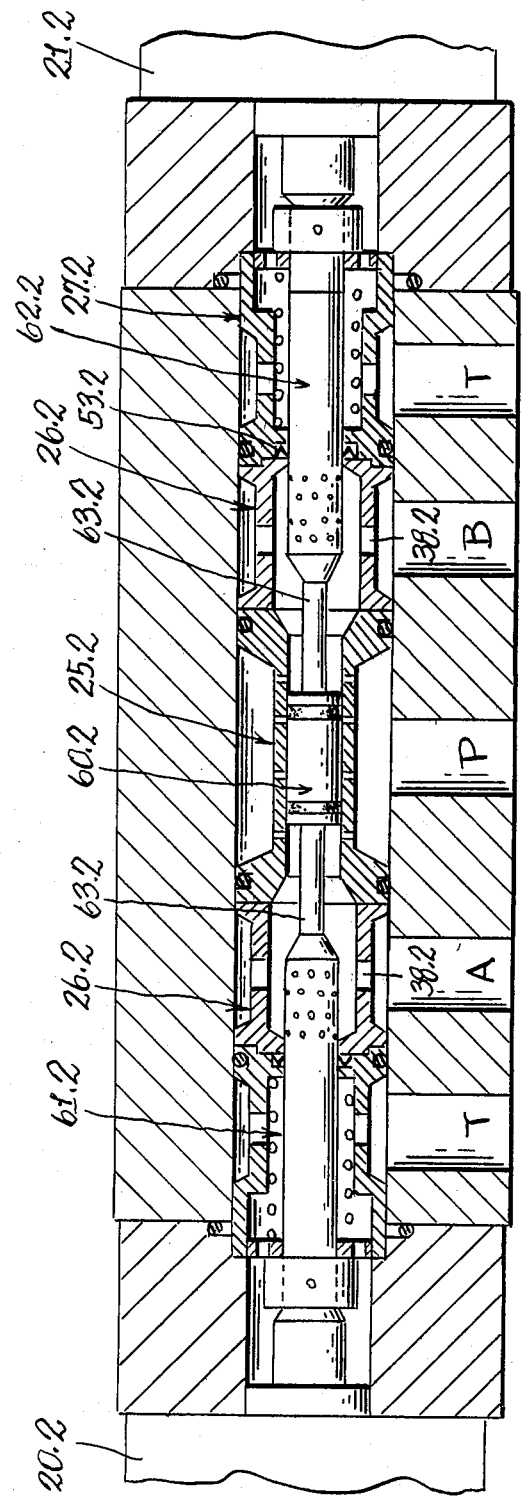
FIG. 6 is a view similar to FIG. 1.

As seen in FIG. 1, a valve body 15 is provided with a bore 16 of uniform diameter. The body may be formed of any suitable rigid material, an aluminum alloy being presently preferred. Ports, P, A. B, and T are formed in the body and have their inner ends in communication with the bore 16. Port P is adapted for connection to a source of liquid under pressure, such as a pump, accumulator and the like. The valve herein disclosed is well adapted to control the flow of water under pressure, preferably a mixture of water (95%) and oil (5%), and this eliminates the need for high-priced hydraulic fluids. Ports A and B are adapted for connection to operating devices, such as ports of a large main valve, or inlet ports of hydraulic cylinders, and the ports T are adapted to connect the exhaust of the respective operating devices to the tank of the liquid system.

Identical end caps 17 and 18 are secured to opposite ends of the valve body to close opposite ends of the bore 16. The end caps are secured in position by bolts (not shown) or in any other suitable manner. O-rings 19 seal the facing surfaces of the body and the end caps against leakage of liquid.

FIG. 1 discloses a valve utilizing two solenoids 20 and 21 for shifting the valve plunger and, in this case, each end cap is formed with an opening 22 in which the hub 23 of a solenoid is secured. The core of each solenoid has an end portion 24 freely extending within an opening 22.

Disposed within the bore 16 of the valve body 15 and in axial alignment, are a center separator 25, two intermediate separators 26 of identical construction, one at each end of the center separator, and two end separators 27 of identical construction, one at each end of the intermediate separators. The separators 25, 26, and 27 may be made of any suitable rigid material and presently it is preferred to machine the separator 25 from stainless steel and the separators 26 and 27 from aluminum alloy, with the later separators anodized after machining.

The opposite ends of the center separator 25 and adjoining ends of the intermediate separators are flat and normal to the axis of the bore 16. The intermediate separators 26 and the end separators 27 also have flat interengaging surfaces (see especially FIG. 3) which are normal to the axis of the bore 16. In addition, each intermediate separator 26 has an extending circular abutment 30 which fits closely within a recess 31 in the adjoining end face of an end separator 27.

The center separator 25 is spool-shaped with enlarged heads 31.1 at each end and a reduced-diameter intermediate portion 32 therebetween. The heads 31.1 are of a diameter to closely but slidably fit within the bore 16 and each has an annular groove to receive an O-ring 33, or any other suitable static seal. As seen in FIG. 1, the intermediate portion 32 of the center separator 25 is aligned with the pressure port P to provide a huge annular space for the pressure liquid. The intermediate portion 32 is provided with radial ports to provide communication between its interior and the annular space. As seen in FIG. 2, the radial ports 35 in the valve shown are in two circular sets slightly spaced on opposite sides of the transverse center 36 of the center separator 25.

Each of the intermediate separators 26 is also spool-shaped with enlarged heads 36 and a reduced-diameter intermediate portion 37 therebetween. The heads 36 are of a diameter to closely but slidably fit within the bore 16, and each intermediate portion 37 is formed with relatively large radial ports 38 which are formed by a drilling operation. Although only two radial ports 38 are visible in FIGS. 1 and 3, it is preferred that six such ports are formed in each intermediate separator for free flow of high volume liquid therethrough.

As seen in FIG. 1, each intermediate separator 26 has its intermediate portion 37 aligned with a respective port A or B of the valve body, each such portion and its radial ports providing for free and high volume flow of liquid between the interior of each separator 26 and the respective body port.

The end separators 27 are also spool-shaped with a head 40 at one end and a longer head 41 at the other end. The heads 40,41 are of a diameter to closely but slidably fit within the bore 16 of the valve body 15. Each end separator has a reduced-diameter intermediate portion 42 between the heads 40,41 and this latter portion is also formed with six relatively large radial ports 43 for free flow of high volume liquid therethrough. As seen in FIG. 1, the intermediate portion 42 of each end separator 27 is adapted for alignment with respective tank ports T of the valve body 15. The head 40 of each end separator 27 has an annular groove for receiving an O-ring 44 or any other suitable sealing device.

As seen in FIG. 1, the separators 25,26 and 27 are arranged in end-to-end relationship within the bore 16 and are of a combined axial length that is greater than the length of the bore 16, so that the end portion of the head 41 of each end separator extends beyond the end of the bore. Each end cap 17 and 18 has its opening 22 counterbored to provide a larger opening 45 to closely receive the extending end portion of a respective head 41. Bolting of the end caps 17 and 18 to opposite ends of the valve body will press the separators 25, 26, and 27, in tightly fitting end-to-end relation, with each separator aligned with its respective valve body port.

Again referring to FIG. 3, it will be seen that the center separator 25 has a cylindrical opening 46 with flared ends 47. Each intermediate separator 26 has a larger cylindrical opening 48 with an inwardly extending annular head 49 at the outer end thereof. Each end separator 27 has a cylindrical opening 50 of a diameter about the same as the opening 48 and an enlarged opening 51 in the head portion 41. Each end separator has an inwardly extending head 52 spaced inwardly of its inner end to form an annular pocket for the reception of a dynamic seal 53. The seal is cup-shaped in cross-section with the cup opening directed toward the adjoining end face of the intermediate separator 26.

Each seal 53 is made of a low friction material and in the presently disclosed embodiment, the seal is formed as a jacket 54 of somewhat C-shape to provide an annular side opening directed to face the system pressure so that the lips of the C-shaped jacket have a tendency to spread apart when the seal is subjected to system pressure. As seen in FIG. 3A, each of the seal jackets has a reduced downstream wall 56 so that only the lips engage the surfaces to be sealed.

The seal jackets are formed of Teflon, or Teflon alloys using strengtheners, such as graphite, carbon, glass fiber, metal oxides, and the like, dependent upon particular requirements. Since Teflon has rather poor memory characteristics, it is preferable to dispose a metal spring 56 (or an elastomeric spring, not shown) within the jacket to urge the lips of the seal jacket against the surfaces to be sealed. Seals of the above type are commercially available from various sources, such as Parker Seal Company; W. H. Shamban & Company; or the Fluorocarbon Company.

A valve plunger is adapted for axial movement through the openings in the center, intermediate and end separators and, as best seen in FIG. 3, such plunger has a center section 60 and opposite end sections 61 and 62, the end sections being joined with the center section by stems 63 of a reduced diameter. The diameter of the center section 60 is of a size to closely but slidably fit within the opening 46 of the center separator 25. The end sections 61 and 62 are preferably of the same diameter as the center section 60 and closely but slidably fit in bearing relationship through openings in the inwardly projecting heads 49 and 52 of respective intermediate and end separators 26 and 27. The parts are shown in full size in FIG. 1, the outside diameter of the center and end sections being about three eights of an inch (09.525 millimeters). The exterior surface of each plunger end section 61, 62 is chrome plated and buffed to a micro finish, and thereafter is shot peened to form very minute indentations therein. These identations tray system liquid to provide a degree of lubrication.

The valve plunger is of novel construction and formed of parts that are readily interchangeable to provide various valving operations. As best seen in FIG. 3, the center section 60 comprises a bushing 65, preferably formed of stainless steel, with a threaded opening longitudinally therethrough. The stems 63 are formed integral with respective end sections 61 and 62 and each stem terminates in an exteriorly threaded stub 66 which fits the internal threads of the bushing 65. Inwardly of each stub is an enlarged circular portion 67 and inwardly of the latter is a further enlarged circular head 68 which has a diameter equal to the outside diameter of the bushing 65. The end of each portion 67 seats in a shallow recess formed in the end of bushing 65 to accurately space each head 68 from the flat end faces of the bushing and define therebetween annular grooves for the reception of dynamic seals 70 which may be of the same type as the seals 53. It will be noted that the opening into each of the seals 70 faces system pressure.

Each end section 61 and 62 of the valve plunger has a drilled opening 71 entering from the end thereof. In the valve shown in FIGS. 1 through 3, the end sections are identical, each having two sets of radial ports 72 drilled therein, with the ports of each end section spaced the same distance from the plunger center section 60, so that in centered position of the valve plunger, the radial ports are disposed within the openings in the intermediate separator sections 26.

The openings in the end sections are closed by plugs 75, each having a reduced-diameter inner end 76 to have force-fit within the drilled openings 71. The plugs 75 preferably have the same external diameter as the end sections 61 and 62, and preferably are made of stainless steel, as are the plunger end sections. Washers 77, also of stainless steel, slidably fit over the plugs 75 and within the opening 51 in the heads 41 of the end separators 27. Each of the washers has a series of holes 78 therethrough for a purpose to be described.

A bushing 79, of stainless steel, is pinned or otherwise secured to the outer end of each plug 75, and a coil spring 80 is interposed between each washer 77 and the inwardly extending head 52 of an outer separator 27, the springs being of equal force to thereby urge the valve plunger to the centered position shown in FIG. 1.

Since the Nylon seals 70 cannot be expanded any great amount, the sectional construction of the valve plunger makes it easy to assemble such seals on the plunger without damage to them. For assembly, the seals 70 need only be disposed on the portion 67 of a stem 63, the only care required is to insure that the opening into the seal is disposed to face system pressure. The stubs 66 are then threaded home into the bushing and the valve plunger is completely assembled. In order to insure that reciprocating action of the plunger over a period of time does not loosen the threaded connection, the bushing 65 may be pinned to the stubs 66. However, at the present time, it is preferred to apply a locking paste, such as Loctite 277, to the threads on the stubs 66 before they are threaded into the bushing 65.

The dynamic seals 53 and 70 are so proportioned with respect to the surfaces against which they engage that such seals are squeezed about ten to fifteen thousands of an inch (approximately 0.39687 millimeters). The valve plunger and separator assembly, as shown in FIG. 3, may be slid into the bore 16 from either end thereof and thereafter the end caps 17 and 18 are bolted to opposite ends of the valve body 15 and the solenoids 20, and 21 assembled with respective end caps.

In the spring-centered position of parts shown in FIG. 1, all ports P, A, B, and T are blocked. When the left-hand solenoid 20 is energized, its core 24 will push the valve plunger to the right an amount sufficient to open the set of radial ports 35 to the left of the centerline 36 of the center separator 25, and dispose the sets of ports 72 in the plunger end section 62 on opposite sides of the dynamic seal 53 carried by the right hand end separator 27, while the ports 72 in the plunger end section 61 will still remain within the opening 48 of the left-hand intermediate separator. In this position of parts, liquid under pressure will enter the large space surrounding the portion 32 of the center separator, flow through the open radial ports 35 in such portion, flow over the stem 63 of the plunger end section 61, flow through the large radial ports in the left-hand intermediate separator 26, and outwardly through valve body port A.

At the same time, liquid from port B will flow through the radial ports 38 in the right-hand intermediate separator 26, to the interior of the latter, through the radial ports 72 of the plunger section 62 which are located on the left side of the dynamic seal 53 in the right hand end separator 27, through the hollow portion of the plunger section 62, through the radial ports 72 on the right side of the seal 53, into the interior of the right hand end separator 27, through the radial ports 43 of the latter, and outwardly of valve body port T. Some of the liquid within the right-hand end separator 27 will flow through the openings 78 in the adjacent washer 77 to the space within opening 22 of end cap 18 to provide lubrication for the core 24 of solenoid 21.

When solenoid 20 is deenergized and solenoid 21 is energized the valve plunger will be moved to the left to connect port P with port B and port A with the left-hand port T. It should be noted that as the valve plunger moves to open one or the other sets of radial ports 35 in the center separator, the liquid under pressure flows through such ports in a direction inwardly of the separator. Thus, as a dynamic seal 70 moves across the ports 35, such seal is compressed by liquid pressure until the plunger has moved sufficiently to clear the seal from the ports, whereupon the seal is again tightly pressed against the plunger and separator surfaces by system pressure. This temporary compression of the dynamic seals insures that the seals will not be nipped by the edges defining the ports 35 to thereby prolong the life of such seals. At the same time, compression of the seals 70 temporarily reduces frictional engagement thereof with the internal surface of the center separator 25 so that the plunger shifts with ease.

It should further be noted that as the sets of ports 72 in the plunger end sections 61 and 62 are moved across the respective dynamic seals 53, such seals are temporarily lifted from the exterior surface of the plunger by reason of the fact that flow of liquid under pressure is from the interior of the hollow portion of the plunger end section. Therefore, the seals 53 will not be nipped by the edges defining the ports 72, and friction is reduced, as above pointed out, with respect to the dynamic seals 70. A valve made in accordance with the foregoing disclosure will provide for smooth shifting of the valve plunger from one position to another. It is known that it takes more pressure to move the valve plunger from a stationary position and the pressure so required is commonly termed the breakaway pressure. Valves heretofore made have required a high degree of breakaway pressure and this has pretty well ruled out use of a reasonable sized solenoid for moving the valve plunger, and has dictated the need for fluid power and a fluid controlled valve to deliver the required force needed to shift the valve plunger, since larger-sized solenoids occupied too much space and therefore were not accepted by the industry. My improved valve will operate with a breakaway pressure of about 14 to 17 pounds, so that the valve plunger may be shifted from a stationary position to another position by use of an industry standardly-accepted solenoid, such as the Decco 11404, commercially available from the Detroit Coil Company.

It is well known that dynamic seals take a set when the valve has been idle for some time, such as twenty four hours or more, and still under pressure, and it is believed that the pressure squeezes out the liquid between the seals and the surface they bear against. However, even when idle for periods in excess of twenty four hours, my improved valve will require a breakaway pressure of only 14 to 17 pounds and this may be attributed to the fact that only four dynamic seals are required, and to the fact that system liquid is entrapped in the minute indentations formed by shot-peening of the plunger end sections 61, 62 to provide lubrication.

My improved valve construction makes it possible to change the liquid control functions of the valve merely by substituting a differently ported center separator or a differently ported plunger end section, or both. For example, as shown in FIGS. 4 and 5, the center sections 25.1 has the same dimensions as the separator 25 heretofore described, but is formed with three sets of radial ports 35.1a, 35.1b and 35.1c, the ports 35.1a and 35.1b being spaced equal distances to the left and right of the transverse centerline 36.1, with the ports 35.1c spaced a further distance from the centerline 36.1.

The plunger end section 62.1 is identical to the section 62 heretofore described. The plunger end section 61.1 is identical in dimensions to the section 61 before described, but has sets of radial ports 72.1 spaced a greater distance apart so that in the centered position of the valve shown in FIG. 4, the sets of ports 72.1 are disposed on opposite sides of the dynamic seal 53.1 in the left-hand end separator 27.1. All other parts of the valve are idential to the valve parts described in connection with the valve shown in FIGS. 1 through 4.

Since it was desired to make the valve of FIGS. 4 and 5 a single solenoid operated type, with the solenoid core acting against the left-hand end of the valve plunger, the right-hand coil spring is omitted, and an end cap 18.1 closes the right-hand end of the bore 16.1. Since no solenoid is used at the right-hand end of the valve body, the opening 22.1 of the end cap 18.1 does not extend completely therethrough. In the interest of uniformity of parts, and end cap just like that of FIG. 1 may be used, with a plug closing the opening therein.

In the position of parts shown in FIG. 4, liquid under pressure flows through port P, into the large annular space formed by the center separator 25.1, through openings 35.1c to the interior of the center separator, over the stem 63.1 of the plunger end section 62.1, through the interior of the right-hand intermediate separator 26.1, through the radial ports 38.1 of the latter, and outwardly of valve body port B. Liquid from the pressure port P is blocked from port A by the center section 60.1 of the plunger. Since the sets of ports 72.1 of the left-hand section 61.1 of the plunger are on opposite sides of the dynamic seal 53.1, liquid will flow from port A to the left-hand port T.

Figure 7:
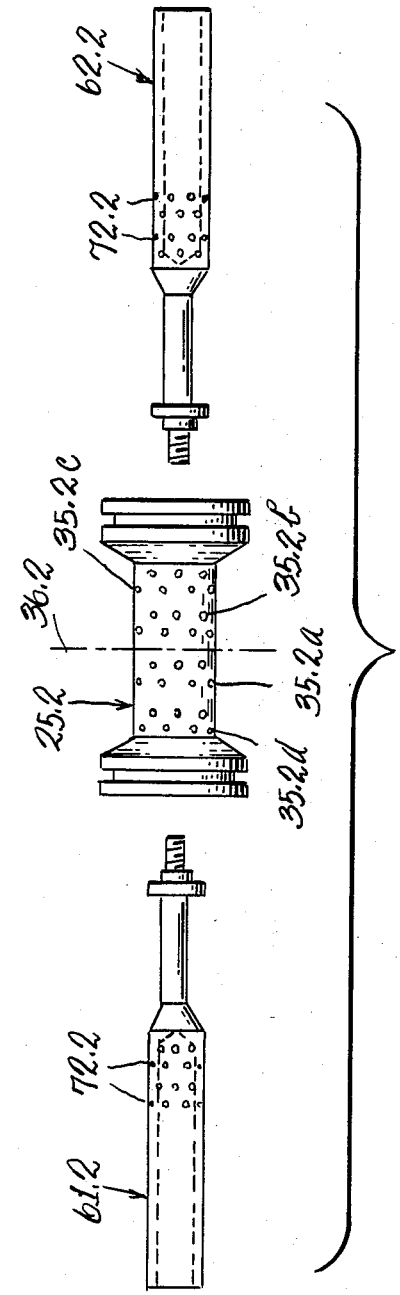
FIG. 7 is a separated elevational view of certain parts used in the construction shown in FIG. 6 to make the valve a spring centered three-position valve.

FIGS. 6 and 7 disclose an arrangement of center sleeve and plunger end portions to provide a different valving operation. The plunger ends 61.2 and 62.2 are idential to, and have the same porting arrangement as, the plunger ends 61 and 62 of the valve shown in FIGS. 1 through 3. The center separator 25.2 is identical in dimensions to the separator 25.1 and similar in that it has radial ports 35.2a, 35.2b, and 35.2c, arranged as in the separator 25.1, but also has a fourth set of radial ports 35.2d to the left of the ports 35.2a.

The valve shown in FIGS. 6 and 7 is a spring-centered, double-solenoid type valve. All parts of this valve are identical to those shown in FIGS. 1 through 3, which the exception of the additional radial ports in the center separators 25.2. In the centered position of the valve plunger, as shown in FIG. 6, liquid under pressure flows through port P to the large annular space surrounding the center separator 25.2, through the radial ports 35.2d, and 35.2c, to the interior of the separators on opposite sides of the center section 60.2 of the plunger, over stems 63.2 of respective plunger end sections 61.2 and 62.2, through the large radial ports 38.2 of respective right and left intermediate separators 26.2 and to respective body ports A and B. It will be noted that the sets of radial ports 72.2 of both end sections 61.2 and 62.2 of the valve plunger are disposed within the interior of the left and right-hand intermediate separators 26.2 and therefore liquid flow to the left and right ports T is blocked.

If the left-hand solenoid 20.2 is energized, the valve plunger is shifted to the right so that the sets of radial ports 72.2 of the right end section 62.2 of the plunger are on opposite sides of the dynamic seal 53.2 carried by the right hand end separator 27.2. In this position of the valve plunger, the sets of radial ports 72.2 of the left-hand section 61.2 of the plunger remain within the left-hand intermediate separator 26.2.

With the valve plunger shifted to the right, pressure liquid is blocked from flow to port B, but port B is in communication with the right-hand port T. The center section 60.2 has been moved to the right to uncover radial ports 35.2d and 35.2a of the center separator 25.2 and port P remains in communication with Port A, and port A remains blocked from the left-hand port T. A reverse of this valving action will take place if the right-hand solenoid 21.2 is energized so as to connect port A to the left-hand port T. Also, port P will be connected to port B, and B will be blocked from the left-hand port T.

The valve construction shown in FIGS. 8 and 9 shows another arrangement that is made possible by choice of center separator and plunger end sections. These drawing figures shown a springless, double-solenoid, two-position valve. The center separator 25.3 is identical to the separator 25.2 shown in FIGS. 6 and 7, in that it has sets of radial ports 35.3d, 35.3a on one side of the centerline 36.3 and sets of radial ports 35.3b, 35.3c on the other side of this centerline. The left and right end sections 61.3 and 62.3 of the valve plunger are identical to the end section 61.1 shown in FIGS. 4 and 5.

The valve plunger is shown in its centered position in FIG. 8 but normally it would not assume this position since there are no centering springs and the valve plunger would be in one or the other of its positions, depending upon which solenoid was energized. If the left-hand solenoid 20.3 is energized, the valve plunger is shifted to the right so as to dispose the left hand set of radial ports 72.3 of the right-hand plunger section 62.3 closer to the dynamic seal 53.3 carried by the right hand separator 27.3, but still to the left of this seal, so that communication between port B and the right hand port T is still established, but communication between port P to port B is interrupted by the center section 60.3 of the plunger. At the same time, the left hand set of radial ports 72.3 of the left hand section 61.3 has been moved to the right of the dynamic seal 53.3 carried by the left hand end separator, so as to interrupt communication between the left-hand port T and port A. Since the center section 60.3 has been moved to the right, communication between ports A and P is maintained.

If the right-hand solenoid is energized, reversal of the above-described flow pattern is established, namely, port P is connected to port B and flow from B to the right hand port T is blocked. At the same time, flow from port P to port A is blocked, and flow from port A to the left hand port T is maintained.

I claim:

1. A fluid control valve, comprising
   a valve body having a bore and a port communicating with said bore,
   a plurality of separators of comparable dimensions whereby any one may be inserted axially within said body bore for cooperation with said port,
   each separator having an axial opening and an exterior surface configured to form an annular space with said body bore adjacent to said port when installed within said body bore, and each of said separators having radial port means for establishing fluid communication between its axial opening and said annular space,
   a plunger adapted to reciprocate axially through the separator installed within said body bore and adapted to cooperate with its radial port means to control said fluid communication,
   the disposition of said radial port means being different in each of said separators, whereby a selected one may be installed within said body bore to provide predetermined valving action.

2. The construction according to claim 1 wherein all of said separators are identical in physical dimensions.

3. The construction according to claim 2 wherein each separator is spool-shaped, having a circular head at each end for slidably fitting said body bore and an intermediate portion between said heads of a reduced diameter to provide said annular space,
   each of said separators having radial port means in the annular wall of said intermediate portion, the radial port means in the various separators being at different locations axially thereof.

4. The construction according to claim 3 wherein each of said separators has axially spaced sets of radial ports, the sets in the various separators being located at different distances from the longitudinal centerline thereof.

5. In a fluid control valve including a body, a plunger reciprocable in a bore in the body of said valve, said plunger comprising,
- a cylindrical bushing slidable axially within said bore to guide movement of said plunger, and a stem portion connected to an end of said cylindrical bushing to extend axially thereof,
- said stem portion having a cylindrical head of a diameter substantially equal to the diameter of said bushing, and a cylindrical shoulder of reduced diameter bearing against said bushing end to space said head from said end to provide an annular groove, and a
- ring-like seal disposed within said groove, the opening of said seal being substantially equal to the diameter of said shoulder and the outer diameter of said seal being substantially equal to the diameter of said bushing, said seal being seated within said groove free of any stress in the connection of said stem portion to said bushing,
- the foregoing construction providing for assembly of said seal with said plunger without undue stretching of the former, by assembling said seal on said cylindrical shoulder prior to the time and stem portion is connected to said bushing.

6. The construction according to claim 5 wherein said valve body has a port communicating with said bore, and wherein said stem portion comprises a stem of a diameter smaller than the diameter of said head and a cylindrical hollow portion of a diameter substantially equal to the diameter of said head,
- said hollow portion having radial port means establishing fluid communication between the interior and exterior of said hollow portion and its port means being correlated with said body port for valving action in a predetermined manner,
- and another stem portion having the same physical dimensions as said first-named stem portion and differing only in that its radial port means is disposed in a different position,
- said other stem portion being connectable to said bushing in place of said first-named stem portion to provide valving action in a different predetermined manner.

7. In a fluid control valve including a body, a plunger reciprocable in a bore in the body of said valve, said plunger comprising;
- a cylindrical bushing slidable axially within said bore to guide movement of said plunger, and stem portions mechanically connected to respective opposite ends of said bushing and extending axially thereof,
- each stem portion having a cylindrical head of a diameter substantially equal to the diameter of said bushing, and a cylindrical shoulder of reduced diameter bearing against a respective bushing end to space said head from said end, to provide a pair of annular grooves,
- and a ring-like seal disposed within each groove, the opening of said seal being substantially equal to the diameter of a respective shoulder and the outer diameter of said seal being no less than the diameter of said bushing, said seals being seated within respective grooves free of any stress in the connection of a stem portion with said bushing,
- the foregoing construction providing for assembly of said seals with said plunger without undue stress of the seals, by assembling each seal on a respective cylindrical shoulder prior to the time a respective stem portion is connected to a respective bushing end.

8. A fluid control valve, comprising:
- a valve body having a bore therethrough, and an inlet pressure port communicating with said bore,
- a spool-like separator within said bore, having an axial opening of uniform diameter and cylindrical heads at its opposite ends to slidably fit within said bore and an intermediate portion of reduced diameter to form an annular space with said bore adjacent to said inlet port, the wall of said intermediate portion having radial port means providing for fluid communication between its axial opening and said annular space, and a
- plunger reciprocable axially within said bore and having a cylindrical bushing slidably fitting within said separator opening and dynamic seal means cooperating with said radial port means to control fluid flow from said inlet pressure port to the separator open, and
- another spool-like separator having the same physical dimensions as said first-named separator and differing only in axial disposition of said radial port means, and other separator being disposable within said body bore in place of said first mentioned separator to provide for different valving action.

* * * * *

UNITED STATES PATENT OFFICE
CERTIFICATE OF CORRECTION

PATENT NO. : 4,220,174
DATED : September 2, 1980
INVENTOR(S) : Russell W. Spitz

It is certified that error appears in the above-identified patent and that said Letters Patent are hereby corrected as shown below:

In the Background and Summary, column 1, lines 20 and 21 "portion" should should be ---portions---.

In the Description, column 4, line 13, "tray" should be ---trap---. Column 7, last line, "shown" should be ---show---.

In claim 5, column 9, line 31 of said column, "and" should be ---said---.

In claim 8, column 10, line 45 of said column, "open" should be ---opening---. Same column, line 49, "and" should be ---said---

Signed and Sealed this

Eleventh Day of November 1980

[SEAL]

Attest:

SIDNEY A. DIAMOND

Attesting Officer

Commissioner of Patents and Trademarks